(12) United States Patent
Fan et al.

(10) Patent No.: US 11,941,770 B2
(45) Date of Patent: Mar. 26, 2024

(54) SYSTEM AND METHOD FOR 3D TRY-ON BASED ON HUMAN POSE AND BODY SHAPE ESTIMATION

(71) Applicants: Beijing Wodong Tianjun Information Technology Co., Ltd., Beijing (CN); JD.com American Technologies Corporation, Mountain View, CA (US)

(72) Inventors: Xiaochuan Fan, Milpitas, CA (US); Dan Miao, San Jose, CA (US); Chumeng Lyu, Mountain View, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 630 days.

(21) Appl. No.: 17/138,213

(22) Filed: Dec. 30, 2020

(65) Prior Publication Data

US 2022/0207596 A1 Jun. 30, 2022

(51) Int. Cl.
*G06T 19/20* (2011.01)
*G06N 3/045* (2023.01)
(Continued)

(52) U.S. Cl.
CPC .............. *G06T 19/20* (2013.01); *G06N 3/045* (2023.01); *G06N 3/08* (2013.01); *G06N 20/00* (2019.01);
(Continued)

(58) Field of Classification Search
CPC .......... G06N 20/00; G06N 3/045; G06N 3/08; G06Q 30/0643; G06T 15/205;
(Continued)

(56) References Cited

U.S. PATENT DOCUMENTS

2017/0300778 A1* 10/2017 Sato ..................... G06T 7/215
2019/0026942 A1* 1/2019 Zhang .................. G06T 15/205
(Continued)

FOREIGN PATENT DOCUMENTS

| CN | 111582036 A | 8/2020 |
|---|---|---|
| CN | 111598656 A | 8/2020 |
| CN | 111968217 A | 11/2020 |

OTHER PUBLICATIONS

International Search Report dated Mar. 22, 2022 issued in PCT/CN2021/140772, 8 pages.
(Continued)

*Primary Examiner* — Ming Wu
(74) *Attorney, Agent, or Firm* — Scully, Scott, Murphy & Presser, P.C.

(57) ABSTRACT

A method and a system for garment try-on. The method includes: capturing a three dimensional (3D) image of a customer; obtaining first 3D pose of the customer in the 3D image; performing a machine learning model on the 3D pose to generate a first skinned multi-person linear model (SMPL) pose; calculating an angle of the whole body rotation of the customer based on the first SMPL pose; when the angle is in a predefined range relative to a front direction of the customer: constructing an SMPL model using the first SMPL pose; and when the angle is out of the predefined range: generating a second SMPL pose using two dimensional (2D) component of the 3D image, and constructing the SMPL model using the second SMPL pose.

20 Claims, 8 Drawing Sheets

3D shape

(51) Int. Cl.
*G06N 3/08* (2023.01)
*G06N 20/00* (2019.01)
*G06T 7/00* (2017.01)
*G06T 7/55* (2017.01)
*G06T 15/20* (2011.01)
*G06T 17/00* (2006.01)
*G06T 19/00* (2011.01)

(52) U.S. Cl.
CPC .............. *G06T 7/55* (2017.01); *G06T 7/97* (2017.01); *G06T 15/205* (2013.01); *G06T 17/00* (2013.01); *G06T 19/00* (2013.01)

(58) Field of Classification Search
CPC ......... G06T 17/00; G06T 19/00; G06T 19/20; G06T 2207/10024; G06T 2207/10028; G06T 2207/20084; G06T 2207/30196; G06T 2210/16; G06T 7/55; G06T 7/70; G06T 7/97
See application file for complete search history.

(56) References Cited

U.S. PATENT DOCUMENTS

2019/0108667 A1* 4/2019 Streuber .................. G06T 13/40
2019/0304173 A1* 10/2019 Chojnowski .............. G06T 7/62
2020/0058137 A1 2/2020 Pujades et al.

OTHER PUBLICATIONS

Pavllo et al., 3D human pose estimation in video with temporal convolutions and semi-supervised training, CVPR 2019, 2019, 7753-7762.
Kolotouros et al, Convolutional mesh regression for single-image human shape reconstruction, CVPR 2019, 2019, 4496-4505 (arXiv:1905.03244).
Xiao et al., Simple baseline for human pose estimation and tracking, ECCV2018, 2018 (arXiv:1804.06208).
Kolotouros, et al., Learning to reconstruct 3D human pose and shape via model-fitting in the loop, ICCV 2019, 2019 (arXiv:1909.12828).
Loper, et al., SMPL: a skinned multi-person linear model, ACM transactions on graphics, 2015, 34(6):1-16.
Bogo et al., Keep it SMPL: automatic estimation of 3D human pose and shape from a single image, European Conference on Computer Vision, 2016.

* cited by examiner

SYSTEM AND METHOD FOR 3D TRY-ON BASED ON HUMAN POSE AND BODY SHAPE ESTIMATION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates generally to the field of three dimensional (3D) human body reconstruction, and more particularly to systems and methods for real-time garment try-on based on human pose and body shape estimation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the rapid development of e-commerce, virtual try-on of garments emerges. An e-commerce platform may provide a human body model, and place a virtual garment or an outfit on the model to see the effect. Based on the appearance of the model wearing the garment or the outfit, a customer can make a good decision whether to purchase the garment or the outfit. The body shape of the customer may also be used instead of the human body model. However, the estimation accuracy of the customer body shape is limited, and it is hard to show the movements of the customer wearing the garment at real-time.

Therefore, an unaddressed need exists in the art to address the aforementioned deficiencies and inadequacies.

SUMMARY

In certain aspects, the present disclosure relates to a method for garment try-on. In certain embodiments, the method includes:
capturing, by a camera, a three dimensional (3D) image of a customer;
obtaining, by a computing device, a first 3D pose of the customer in the 3D image;
generating, by the computing device performing a machine learning model on the first 3D pose, a first skinned multi-person linear model (SMPL) pose, where the first SMPL pose comprises a plurality of rotation matrixes representing rotations of the customer's joints and a global rotation matrix representing whole body rotation of the customer;
calculating, by the computing device, an angle of the whole body rotation of the customer based on the global rotation matrix;
when the angle of the whole body rotation is in a predefined range relative to a front direction of the customer: constructing an SMPL model (or human body model) using the first SMPL pose; and
when the angle of the whole body rotation is out of the predefined range: generating a second SMPL pose using two dimensional (2D) component of the 3D image, and constructing the SMPL model using the second SMPL pose.

In certain embodiments, the method further includes dressing a garment model onto the SMPL model, and displaying the SMPL model dressed in the garment model on a display connected to the computing device. In certain embodiments, the method further includes purchasing the garment according to an instruction from the customer. In certain embodiments, the method further includes rendering the SMPL model using the image of the customer.

In certain embodiments, the machine learning model includes: a non-residual block comprising a first fully-connected layer, a first batchnorm layer, and a first rectified linear unit (ReLU) layer; a first residual block connected to the non-residual block, comprising a second fully-connected layer, a second batchnorm layer, and a second ReLU layer; a second residual block connected to the first residual block, comprising a third fully-connected layer, a third batchnorm layer, and a third ReLU layer; a plurality of joint self-attention blocks connected to the second residual block, each of the plurality of the joint self-attention blocks predicting a feature corresponding to one of a plurality of joints of the customer; and a global self-attention block connected to the second residual block, predicting an overall feature corresponding to all of the plurality of joints of the customer.

In certain embodiments, the predefined range is −70 to 70 degrees relative to the front direction of the customer. In certain embodiments, the predefined range is −80 to 80 degrees relative to the front direction of the customer. In certain embodiments, the predefined range is −85 to 85 degrees relative to the front direction of the customer. In certain embodiments, the predefined range is −90 to 90 degrees relative to the front direction of the customer.

In certain embodiments, the camera is a 3D ORBBEC camera, and the step of obtaining the first 3D pose of the customer is performed by an ORBBEC 3D pose model.

In certain embodiments, the step of generating the second SMPL pose of the user includes: estimating a 2D pose of the customer from the 2D component of the 3D image, converting the 2D pose to a second 3D pose using a temporal dilated convolutional model, and generating the second SMPL pose from the second 3D pose using the machine learning model.

In certain embodiments, the first 3D pose or the second 3D pose includes 3D coordinates of 12 points of the customer, and the 12 joints include: left shoulder, right shoulder, left elbow, right elbow, left wrist, right wrist, left hip, right hip, left knee, right knee, left ankle, and right ankle.

In certain embodiments, the step of obtaining the second SMPL pose of the user is performed using an end-to-end pose and shape estimation model. In certain embodiments, the end-to-end and shape estimation model is graph convolutional mesh regression (CMR).

In certain aspects, the present disclosure relates to a system for garment try-on. In certain embodiments, the system includes a computing device and a camera connected to the computing device. The computing device has a processor and a storage device storing computer executable code. The computer executable code, when executed at the processor, is configured to:

instruct the camera to capture a 3D image of a customer; obtain a first 3D pose of the customer in the 3D image; generate, by performing a machine learning model on the first 3D pose, a first skinned multi-person linear model (SMPL) pose, where the first SMPL pose comprises a plurality of rotation matrixes representing rotations of the customer's joints and a global rotation matrix representing whole body rotation of the customer; calculate an angle of the whole body rotation of the customer based on the global rotation matrix; when the angle of the whole body rotation is in a predefined range relative to a front direction of the customer: construct an SMPL model using the first SMPL pose; and when the angle of the whole body rotation is out of the predefined range: generate a second SMPL pose using 2D component of the 3D image, and construct the SMPL model using the second SMPL pose.

In certain embodiments, the computer executable code is further configured to dress a garment model onto the SMPL model, and display the SMPL model dressed in the garment model on a display connected to the computing device.

In certain embodiments, the machine learning model includes: a non-residual block comprising a first fully-connected layer, a first batchnorm layer, and a first rectified linear unit (ReLU) layer; a first residual block connected to the non-residual block, comprising a second fully-connected layer, a second batchnorm layer, and a second ReLU layer; a second residual block connected to the first residual block, comprising a third fully-connected layer, a third batchnorm layer, and a third ReLU layer; a plurality of joint self-attention blocks connected to the second residual block, each of the plurality of the joint self-attention blocks predicting a feature corresponding to one of a plurality of joints of the customer; and a global self-attention block connected to the second residual block, predicting an overall feature corresponding to all of the plurality of joints of the customer.

In certain embodiments, the predefined range is −70 to 70 degrees relative to the front direction of the customer. In certain embodiments, the predefined range is −80 to 80 degrees relative to the front direction of the customer. In certain embodiments, the predefined range is −85 to 85 degrees relative to the front direction of the customer. In certain embodiments, the predefined range is −90 to 90 degrees relative to the front direction of the customer.

In certain embodiments, the camera is a 3D ORBBEC camera, and the computer executable code is configured to obtain the first 3D pose of the customer using an ORBBEC 3D pose model provided by ORBBEC company.

In certain embodiments, the computer executable code is configured to generate the second SMPL pose of the user by: estimating a 2D pose of the customer from the 2D component of the 3D image, converting the 2D pose to a second 3D pose using a temporal dilated convolutional model, and generating the second SMPL pose from the second 3D pose using the machine learning model.

In certain embodiments, the first 3D pose or the second 3D pose includes 3D coordinates of 12 points of the customer, and the 12 joints include: left shoulder, right shoulder, left elbow, right elbow, left wrist, right wrist, left hip, right hip, left knee, right knee, left ankle, and right ankle.

In certain embodiments, the computer executable code is configured to obtain the second SMPL pose of the user using an end-to-end pose and shape estimation model. In certain embodiments, the end-to-end and shape estimation model is graph convolutional mesh regression (CMR).

In certain aspects, the present disclosure relates to a non-transitory computer readable medium storing computer executable code. In certain embodiments, the computer executable code, when executed at a processor of a computing device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DETAILED DESCRIPTION

Figure 1:
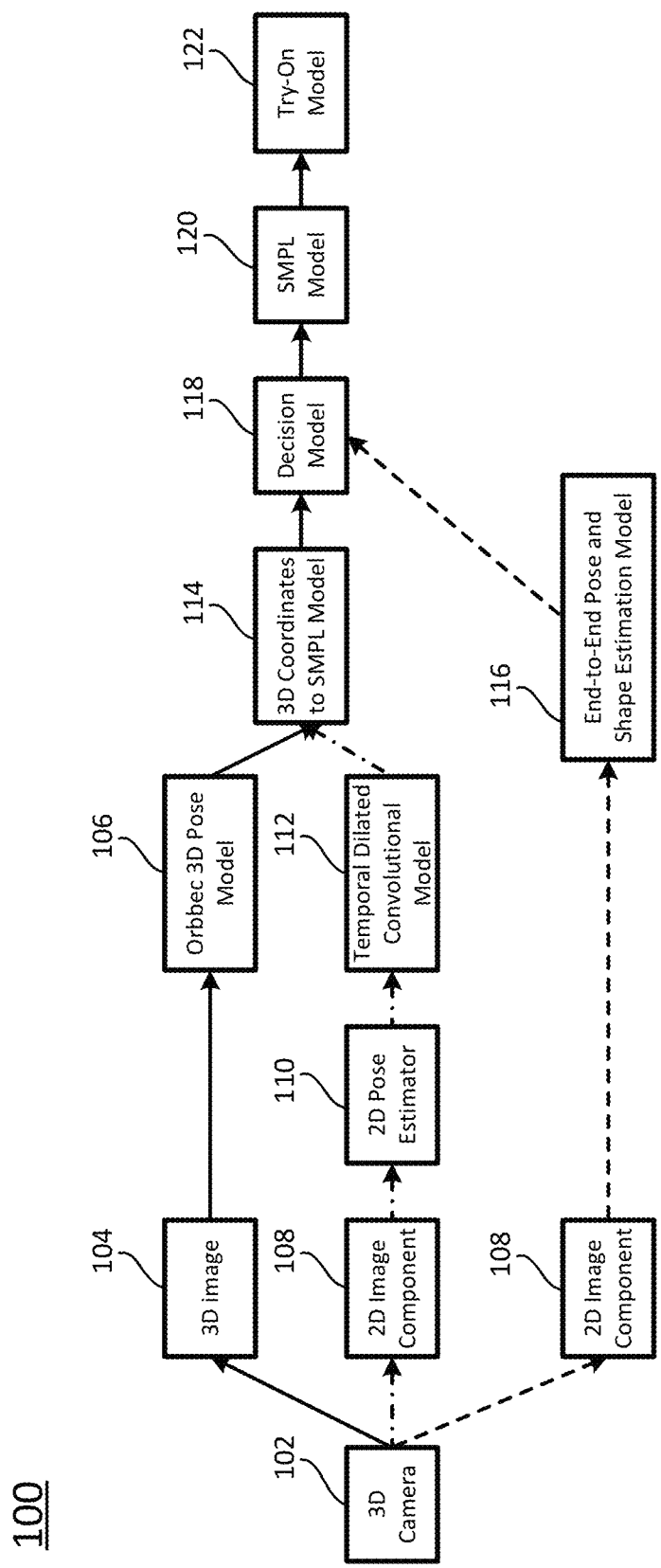
FIG. 1 schematically depicts a pipeline for real-time garment try-on according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the purpose of the present disclosure is to estimate 3D human pose and reconstruct human body with a real-time speed. In certain embodiments, the technique is used for a 3D virtual try-on system in offline stores. The try-on system requires real-time 3D human pose estimation and body shape reconstruction to help create a realistic try-on scene. The predicted results can be used in various applications. For example, one application is to generate the 3D pose estimation results for users and use the predicted results to control prebuilt 3D animation for many entertainment purposes.

In certain aspects, the present disclosure achieves the above purpose by designing a novel pipeline incorporating (1) the combination of temporal dilated convolutional model and 3D pose keypoints to SMPL transferring model, (2) 3D pose keypoints to SMPL transferring model, and (3) end-to-end human pose and shape estimation model.

FIG. 1 schematically depicts a pipeline 100 for garment try-on according to certain embodiments of the present disclosure. As shown in FIG. 1, when a 3D camera 102 captures a 3D image 104 of a customer, the first route is to use the 3D image 104 as input to obtain 3D pose coordinates using the 3D pose model 106, use the 3D coordinates to SMPL model 114 to correspond the 3D pose coordinates to SMPL model parameters, construct the human model by the SMPL model 120 using the SMPL model parameters, and try on garments using the try-on model 122.

The second route is to use the 2D image component 108 of the 3D image 104 as input to estimate 2D pose coordinates by the 2D pose estimator 110, use the temporal dilated convolutional model 112 to convert the 2D pose coordinates to 3D pose coordinates, use the 3D coordinates to SMPL model 114 to correspond the 3D pose coordinates to SMPL model parameters, construct the human model by the SMPL model 120 using the SMPL model parameters, and try on garments using the try-on model 122.

An alternative route to the second route is to use the 2D image component 108 of the 3D image 104 as input for the end-to-end pose and shape estimation model 116. The end-to-end pose and shape estimation model 116 uses the 2D image component 108 to generate SMPL model parameters. The SMPL model 120 uses the generated SMPL model parameters to construct a human model, and the try-on model 122 then uses the constructed human model to try on virtual garments.

In certain embodiments, the system 100 includes the first route and the second route. In certain embodiments, the system 100 includes the first route and the alternative route. The pipeline further includes a decision model 118, which decides which of the routes should the pipeline take for a specific image input. When the system 100 includes the first route and the second route, the end-to-end pose and shape estimation model 116 is not necessary. Under this situation, the first route is the predominant route, and the 3D coordinates to SMPL model 114 generates SMPL model parameters from the output of the 3D pose model 106. One of the SMPL model parameters represents global rotation of the customer, and if the global rotation is within a predetermined range, the decision model 118 would decide to move forward with the SMPL model construction using the SMPL model parameters, the try-on model 122 would perform the try-on action, and for the next image, the process would continue through the first route.

If the decision model 118 determines that the global rotation is out of the predetermined range, the decision model 118 would switch to the second route, perform functions of the modules 108, 110, 112 and 114 sequentially to obtain the SMPL model parameters, construct the SMPL model by the module 120, perform the try-on process by the module 122, and continue with the next image through the second route. The next image is processed by the modules 108, 110, 112 and 114 sequentially to obtain the SMPL model parameters, and the decision model 118 would make decision based on global rotation of the customer in the SMPL model parameters. If the global rotation is out of the predetermined range, the decision model 118 would decide to move forward with the SMPL model construction using the SMPL model parameters, the try-on model 122 would perform the try-on action, and the process continues with the second route using a new image following the next image. If the global rotation is within the predetermined range, the decision model 118 would decide to switch back to the first route.

When the system 100 includes the first route and the alternative route, the modules 110 and 112 are not necessary. Under this situation, the decision making process is substantially the same as above, except that the end-to-end pose and shape estimation model 116 would provide the SMPL model parameters, the SMPL model parameters include the global rotation of the customer, and the global rotation can be used for deciding whether to switch routes between the first route and the alternative route or not.

Kindly note that when the global rotation of the customer is out of or is greater than the predetermined angle, the customer faces backward or almost faces toward his sides. The second or the alternative route is performed under this situation because direct 3D pose estimation by the 3D model 106 may not be accurate.

In certain embodiments, the 3D camera 102 is an ORBBEC 3D camera, and the 3D pose model 106 is an ORBBEC 3D pose model provided by ORBBEC Company. In certain embodiments, the 2D pose estimator 110, the temporal dilated convolutional model 112, the 3D coordinates to SMPL model 114, and the end-to-end pose and shape estimation model 116 are pretrained models.

By capturing the movements of a customer in front of the camera, the customer's turning a round or raising his hand can be shown on a display at real-time. The customer shown on the display is the SMPL human body model, with the virtual garment model dressed on the SMPL human body model.

Figure 2:
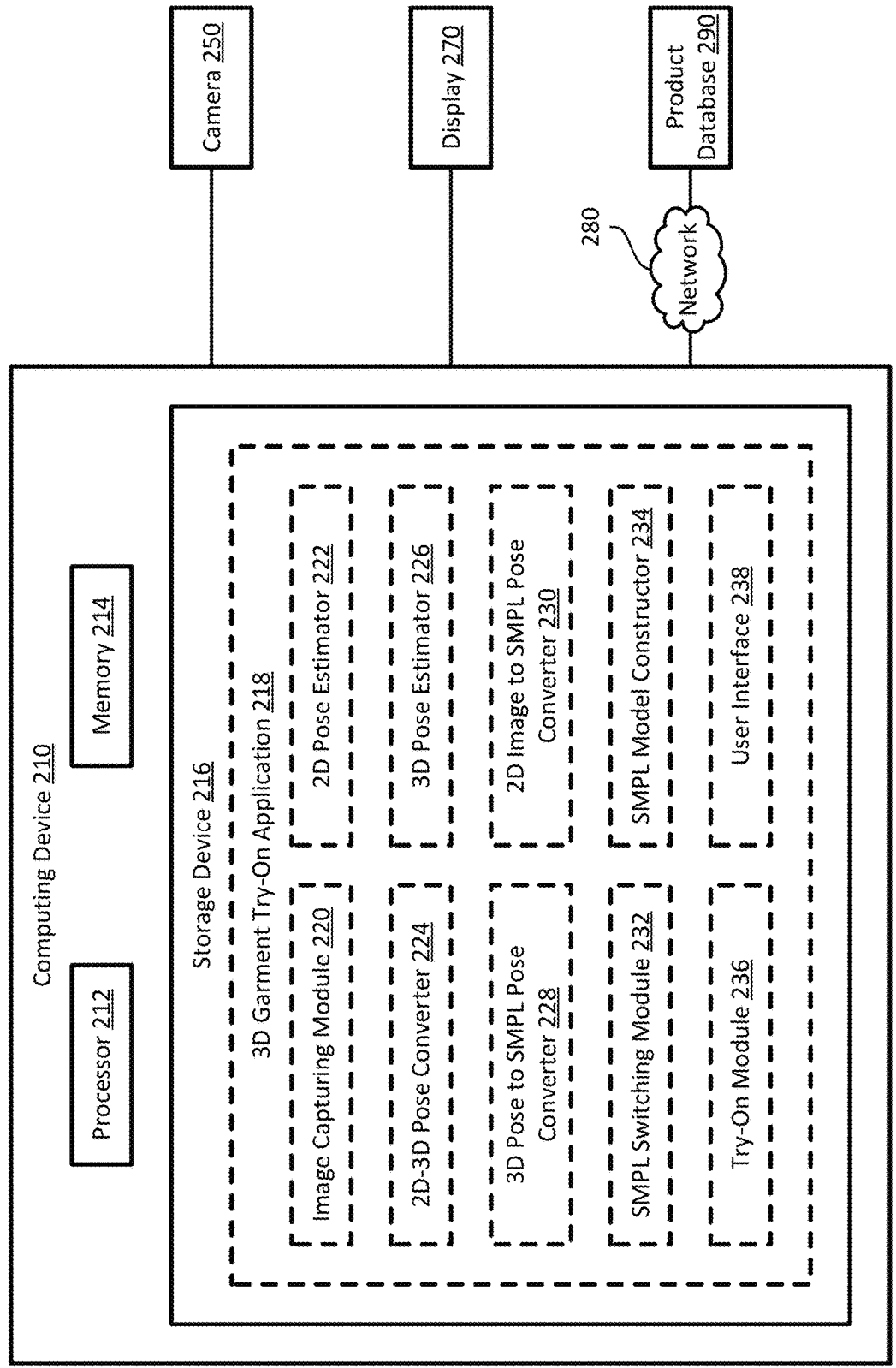
FIG. 2 schematically depicts a system for real-time garment try-on according to certain embodiments of the present disclosure.

FIG. 2 schematically depicts a system for real-time garment try-on according to certain embodiments of the present disclosure. As shown in FIG. 2, the system 200 includes a computing device 210, a camera 250, a display 270, and a product database 290. In certain embodiments, the computing device 210 may be a server computer, a cluster, a cloud computer, a general-purpose computer, a headless computer, or a specialized computer. The camera 250 is directly connected to the computing device 210, is integrally formed with the computing device 210, or is connected to the computing device 210 via a network. The camera 250 may be a 3D camera such as an ORBBEC camera. The display 270 is directly connected to the computing device 210, is integrally formed with the computing device 210, or is connected to the computing device 210 via a network. The display 270 may be a large screen monitor. The product database 290 is connected to the computing device 210 via the network 280 or stored in the computing device 210. The product database 290 includes virtual models of garments, and the virtual models of the garments are accessible to the computing device 210, such that the computing device 210 can place the virtual model of the garments onto human models generated by the computing device 210. In certain embodiments, the network 280 may be a wired or wireless network, and may be of various forms. Examples of the networks may include, but is not limited to, a local area network (LAN), a wide area network (WAN) including the Internet, or any other type of networks. The best-known computer network is the Internet. In certain embodiments, the network 280 may be an interface such as a system interface or a USB interface other than a network, or any other types of interfaces to communicatively connect the computing device 210 and the product database 290.

The computing device 210, the camera 250, and the display 270 are arranged together such that when a customer stands at a predetermined area and faces the camera 250 and the display 270, the camera 250 would capture images or video frames of the customer and send the captured images to the computing device 210, the computing device 210 would generate a human body model based on the captured images, retrieve a virtual garment model from the product database 290, place the virtual garment model onto the human body model, and show the combined model on the display 270. In certain embodiments, the computing device 210 may also render the human body model and optionally the garment model.

The computing device 210 may include, without being limited to, a processor 212, a memory 214, and a storage device 216. In certain embodiments, the computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the computing device 210. In certain embodiments, the processor 212 can execute an operating system (OS) or other applications of the computing device 210. In certain embodiments, the computing device 210 may have more than one CPU as the processor, such as two CPUs, four CPUs, eight CPUs, or any suitable number of CPUs. In certain embodiments, the processor 212 also includes a graphic processing unit (GPU), to accelerate the processing of images. The memory 214 may be a volatile memory, such as the random-access memory (RAM), for storing the data and information during the operation of the computing device 210. In certain embodiments, the memory 214 may be a volatile memory array. In certain embodiments, the computing device 210 may run on more than one processor 212 and/or more than one memory 214. The storage device 216 is a non-volatile data storage media or device. Examples of the storage device 216 may include flash memory, memory cards, USB drives, solid state drives, or other types of non-volatile storage devices such as hard drives, floppy disks, optical drives, or any other types of data storage devices. In certain embodiments, the computing device 210 may have more than one storage device 216. In certain embodiments, the computing device 210 may also include a remote storage device 216.

The storage device 216 stores computer executable code. The computer executable code includes a 3D garment try-on application 218. The 3D garment try-on application 218 includes the code or instructions which, when executed at the processor 212, may perform garment try-on for the customer. In certain embodiments, the 3D garment try-on application 218 may not be executable code, but in a form of circuit corresponding to the function of the executable code. By providing a circuit instead of executable code, the operation speed of the 3D garment try-on application 218 is greatly improved. In certain embodiments, as shown in FIG. 2, the 3D garment try-on application 218 includes, among other things, an image capturing module 220, a 2D pose estimator 222, a 2D-3D pose converter 224, a 3D pose estimator 226, a 3D pose to SMPL parameter converter 228, am image to SMPL pose converter 230, an SMPL switching module 232, an SMPL model constructor 234, a try-on module 236, and a user interface 238. Kindly note that the 2D pose estimator 222 and the 2D-3D pose converter 224 correspond to the second route described above, and the 2D image to SMPL pose converter 230 corresponds to the alternative route described above.

Accordingly, the 3D garment try-on application 218 does not have to include the 2D image to SMPL pose converter 230 when switching between the first and second route, and the 3D garment try-on application 218 does not have to include the 2D pose estimator 222 and the 2D-3D pose converter 224 when switching between the first and the alternative route. The image capturing module 220 is configured to instruct the camera 250 to capture images or video frames of a customer, and send the images to the 3D pose estimator 226, and to the 2D pose estimator 222 or the 2D image to SMPL pose converter 230. Kindly note the images are processed one by one by the modules. In certain embodiments, the camera 250 may be a 3D camera such as an ORBBEC 3D camera, or may include a depth camera and an red-green-blue (RGB) camera. The image capturing module 220 is configured to send the 3D images, or the 2D images and the depth images, to the 3D pose estimator 226, but only send 2D image component of the 3D images, or the 2D images, to the 2D pose estimator 222 or the 2D image to SMPL pose converter 230.

The 2D pose estimator 222 is configured to, upon receiving the 2D image from the image capturing module 220, estimate 2D pose of the customer in the image, and send the 2D pose to the 2D-3D pose converter 224. In certain embodiments, the 2D pose estimator 222 is a lightweight 2D human pose estimation model, and the estimated 2D pose of the customer is represented by 2D keypoint coordinates. The 2D keypoint coordinates are in the form of (x, y) indicating locations of the human body keypoints in the 2D image. The value of x and y may be a pixel value. The number of keypoints vary according to different estimators used, such as 12 keypoints, 13 keypoints, 14 keypoints defined in Leeds Sports Pose Dataset (LSP), and 17 keypoints defined in COCO. For example, the 17 keypoints may include nose, left_eye, right_eye, left_ear, right_ear, left_shoulder, right_shoulder, left_elbow, right_elbow, left_wrist, right_wrist, left_hip, right_hip, left_knee, right_knee, left_ankle, right_ankle. In certain embodiments, considering speed and consistency between different models in the application, the disclosure uses 12 keypoints model, which includes the keypoints of left_shoulder, right_shoulder, left_elbow, right_ elbow, left_wrist, right_wrist, left_hip, right_hip, left_knee, right_knee, left_ankle, right_ankle. In certain embodiments, the present disclosure may also use a 13 keypoints model, where a head keypoint is added to the 12 keypoints model. In certain embodiments, the 2D pose estimator 222 is a deep learning model such as a convolutional neural networks (CNNs) based model. In certain embodiments, the 2D pose estimator 222 uses a top-down approach. In certain embodiments, the 2D pose estimator 222 is a single pose estimation model to detect and optionally track one person. In certain embodiments, the 2D pose estimator 222 may be convolutional pose machine (CPM), Hourglasss, OpenPose, multi-stage pose estimation network (MSPN), high-resolution net (HRNet), cascade feature aggregation (CFA) for human pose estimation, soft-gated skip connections, etc. In certain embodiments, the 2D pose estimator 222 is the one described in "simple baseline for human pose estimation and tracking" by Xiao, et al, ECCV 2018 (arXiv:1804.06208), which is incorporated herein by reference in its entirety. In certain embodiments, the 2D pose estimator 222 is fast and simple, and is pre-trained.

The 2D-3D pose converter 224 is configured to, upon receiving the 2D pose, convert the 2D pose to 3D pose, and send the 3D pose to the 3D pose to SMPL pose converter 228. The 2D pose may be represented by the 2D coordinates of the 12 keypoints in the form of (x, y), and the 3D pose may be represented by the 3D coordinates of the 12 keypoints in the form of (x, y, z). In certain embodiments, the 2D-3D pose converter 224 is a temporal dilated convolutional model. In certain embodiments, the temporal dilated convolutional model takes the basic structure as shown by Dario Pavllo, et al., "3D human pose estimation in video with temporal convolution and semi-supervised training," CVPR 2019, which is incorporated herein by reference in its entirety. The 2D-3D pose converter 224 is pre-trained, for example, using sequential images. However, during use, the 2D-3D pose converter 224 can process one single image.

The 3D pose estimator 226 is configured to, upon receiving the 3D image from the image capturing module 220, estimate 3D pose, and send the 3D pose to the 3D pose to SMPL pose converter 228. In certain embodiments, the 3D pose is represented by 3D coordinates (x, y, z) of 3D keypoints, such as 12 keypoints including left_shoulder, right_shoulder, left_elbow, right_elbow, left_wrist, right_wrist, left_hip, right_hip, left_knee, right_knee, left_ankle, right_ankle. In certain embodiments, when the camera 250 is an ORBBEC 3D camera, the 3D keypoint coordinates may be extracted easily from the ORBBEC software equipped with the 3D camera. In certain embodiments, the 3D pose estimator 226 is coded using ORBBEC ASTRA SDK. In certain embodiments, even if a head keypoint is added as the $13^{th}$ keypoint, the present disclosure may not use the head keypoint in the converting process below by the 3D pose to SMPL pose converter 228, because the definition of the head keypoint by the 3D pose estimation is different from the definition of the head in the SMPL model.

The 3D pose to SMPL pose converter 228 is configured to, upon receiving the 3D keypoint coordinates from the 3D pose estimator 226 or from the 2D-3D pose converter 224, obtain SMPL pose parameters corresponding to the 3D keypoint coordinates, and send the SMPL pose parameters to the SMPL switching module 232. The input of the converter is 12 keypoint coordinates in the form of (x, y, z) or 13 keypoint coordinates if head coordinates are included, and the outputted SMPL pose parameters $\vec{\theta}$ include 24 matrices. Each of the 24 matrices may be in the form of 3×3, where 23 of the matrices define joint angles between the joints (keypoints), and one matrix defines global parameters. Each joint angle represents relative angles and rotations between two adjacent joints, and the global parameters represent the overall angle of the human body, such as the facing direction of the human body. The pose parameters are important and contain more information than 3D keypoint coordinates. For example, if a person maintains a pose still but only rotates his wrist, the 3D keypoint coordinates stay the same, but the pose parameters, specifically the joint angle between the wrist and the corresponding elbow, change. Accordingly, the same 3D coordinates of two keypoints may give different joint angles. The correspondence between 3D keypoint coordinates and SMPL pose parameters can be learned.

Figure 3C:
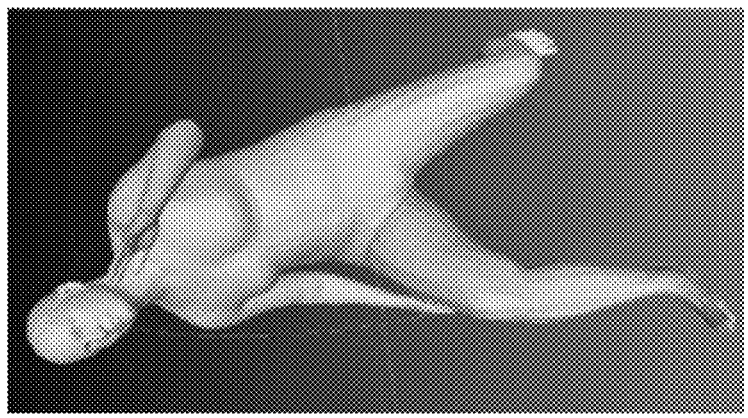
FIG. 3C schematically depicts SMPL model corresponding to the 3D human pose in FIG. 3A and FIG. 3B.
Figure 3B:
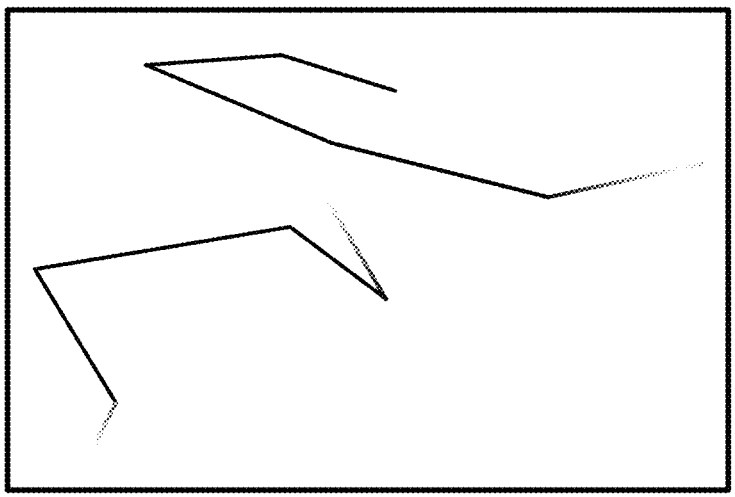
FIG. 3A and FIG. 3B schematically depict 3D human pose according to certain embodiments of the present disclosure.
Figure 3A:
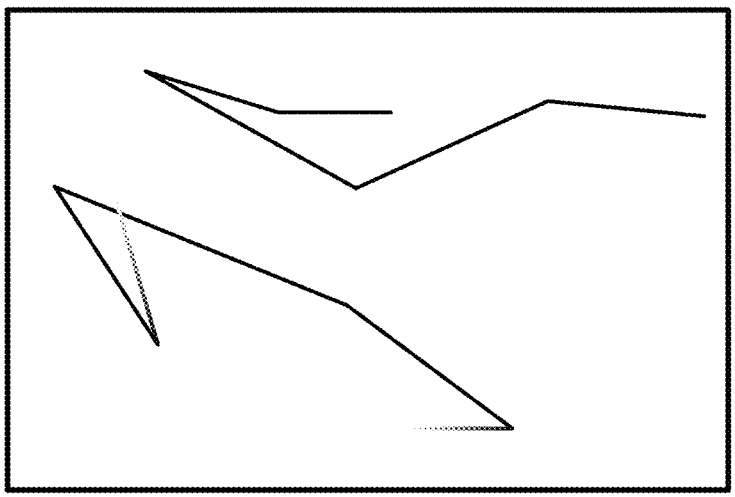

The 3D pose to SMPL pose network is an ill-posed but useful problem to predict SMPL pose parameters from 3D human pose, since 3D human pose does not have all information required by SMPL-pose, i.e., there are infinite number of solutions. But based on big data, the disclosure can find the solution which may comply with physiological knowledge most. FIGS. 3A-3C schematically depict input and output of the 3D pose to SMPL pose converter 228 according to certain embodiments of the present disclosure. FIG. 3A and FIG. 3B show a 3D human pose (or 3D skeleton, 3D locations of human keypoints/joints) obtained from the 3D pose estimator 226. FIG. 3A and FIG. 3B respectively show the same pose of the customer viewing from different angles, such that the FIG. 3A and the FIG. 3B, when combined, represent a 3D effect of the pose. FIG. 3C shows an SMPL model generated using the outputted SMPL pose parameters. In certain embodiments, the 3D pose to SMPL pose converter 228 is well trained before being deployed in the garment try on application.

Figure 4:
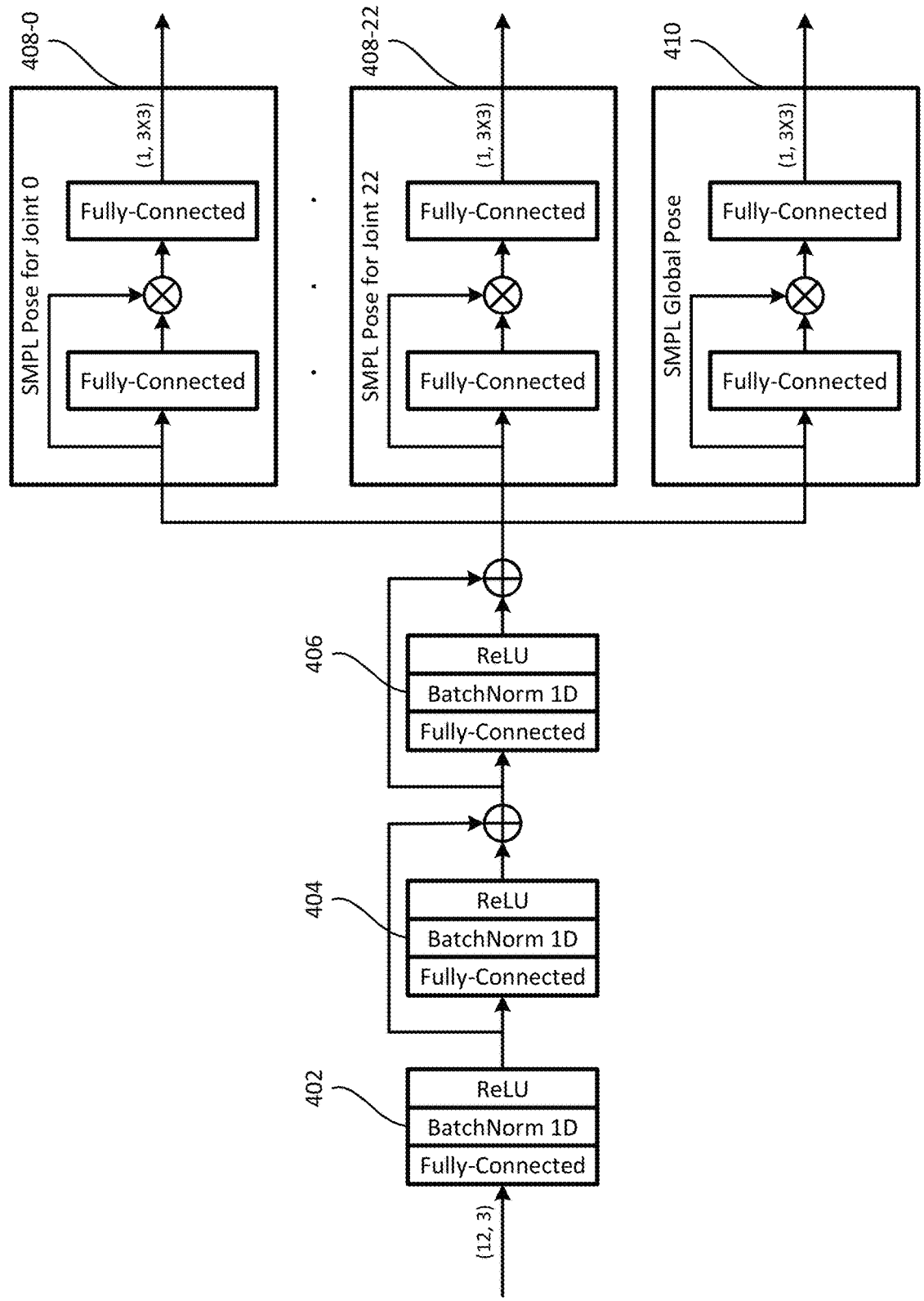
FIG. 4 schematically depicts a model architecture of the 3D pose to SMPL pose converter according to certain embodiments of the present disclosure.

FIG. 4 schematically depicts a model structure of the 3D pose to SMPL pose converter 228 according to certain embodiments of the present disclosure. The input of the 3D pose to SMPL pose converter 228 is one 3D human pose consisting of 3D locations of 12 human-body joints, the output is SMPL pose parameters (24 3×3 rotation matrices, 23 for human joints, and 1 for the global rotation matrix).

As shown in FIG. 4, the backbone of the 3D pose to SMPL pose converter 228 is a network consisting of blocks each built by a fully-connected layer, a batchnorm layer, and a ReLU layer. There are a total of three blocks, including one non-residual block 402 followed by two residual blocks 404 and 406. The disclosure is mainly about a self-attention blocks 408-0 to 408-22 and 410 following the backbone. Firstly, 24 (23 human joints+1 global rotation) copies of backbone feature is produced. Then, an attention mask for each backbone feature (produced by a fully-connected layer shown in 408-0 to 408-22 and 410, taking backbone feature as input) is multiplied with a backbone feature to produce specific feature for each prediction tasks. Finally, these features are feed to 24 decoders (fully-connected layers shown in 408-0 to 408-22 and 410) to produce 24 predictions.

This network is designed to predict rotation matrixes of 23 human-body joints and the whole body, which can be consider as a multi-task (24 tasks) learning. The backbone takes the whole 3D human pose as input and produces a feature. This feature can capture global information well, but may lose focus for each task. For example, wrist prediction may require different focus (attention) from the one for hip prediction. The self-attention blocks can produce attention mask for each task and further improve accuracy compared with classic architecture.

There are two matrixes to measure quantitative accuracy: one is mean rotation distance, the other is mean 3D pose distance. The rotation distance is L2 distance between ground-truth rotation matrix and predicted rotation matrix, and the 3D pose distance is L2 distance between ground-truth 3D joint locations (input 3D joint locations may have noise) and 3D joint locations generated by predicted SMPL parameters. By using the self-attention block, mean rotation distance is reduced by about 1%, and 3D joint distance is reduced by about 20%.

As described above, it is an ill-posed problem to predict SMPL pose parameters from 3D human pose. It is impossible to predict exact SMPL pose parameters from 3D human pose. But the predicted SMPL parameter should generate 3D human pose which is aligned with ground-truth. From experimental results of the disclosure, we can see that the model which uses self-attention block performs much better on 3D pose alignment than the same model without self-attention block.

Kindly note that the 3D pose to SMPL pose conversion is preferably processed one image by one image, and the time domain relations between the neighboring images may not considered. In certain embodiments, due to the difficulty of collecting and label real pictures, training of the 3D pose to SMPL pose converter 228 is inefficient. To improve the training of the 3D pose to SMPL pose converter 228, the present disclosure uses poses as input, where the pose of a person is defined by locations of marks attached to the person. In certain embodiments, the present disclosure adds noises to the training data, which improves the training result. In certain embodiments, the training is performed using SURREAL dataset, which may be customized before training.

Referring back to FIG. 2, the image to SMPL pose converter 230 is configured to, upon receiving the 2D image component of the 3D image from the image capturing module 220, process the image to obtain SMPL pose, and send the SMPL pose to the SMPL switching module 232. In certain embodiments, the SMPL pose converter 230 is a deep learning model, which uses 2D image as input to output SMPL pose parameters. Ground truth is required for training the image to SMPL pose converter 230. However, it is difficult to label the training data to cover different human bodies and different human body movements. Therefore, the situations the image to SMPL pose converter 230 can cover are limited. Further, time domain is not considered in the image to SMPL pose converter 230, and jitter is common if the image to SMPL pose converter 230 is used continuously to make SMPL prediction for garment try-on. Therefore, the image to SMPL pose converter 230 is only regarded as a complementary to the 3D pose to SMPL pose converter 228.

In certain embodiments, the image to SMPL pose converter 230 may be further configured to obtain the shape of the customer, for example, from the first 2D image or the 2D component of the first 3D image of the customer, and send the shape parameters to the SMPL model constructor 234. Alternatively, there may be another specific module configured to extract or retrieve the shape parameters. The number of the shape parameters may be ten, and some of the ten shape parameters are related to the height and weight of the customer. In certain embodiments, some or all the shape parameters of the customer can also be inputted by the customer via the user interface 238.

In certain embodiments, the image to SMPL pose converter 230 is a graph convolutional mesh regression (CMR) model. In certain embodiments, the CMR model has the basic architecture as that described in Nikos Kolotouros, et al., "Convolutional mesh regression for single-image human shape reconstruction," CVPR 2019, which is incorporated herein by reference in its entirety. The CMR model takes an image of a human body as input and outputs SMPL pose parameters for the human body. In certain embodiments, other suitable models may be used as the image to SMPL pose converter 230. For example, SPIN (SMPL oPtimization IN the loop) as described by Kolotouros, et al., Learning to reconstruct 3D human pose and shape via model-fitting in the loop, ICCV 2019, which is incorporated herein by reference in its entirety.

Figure 6:
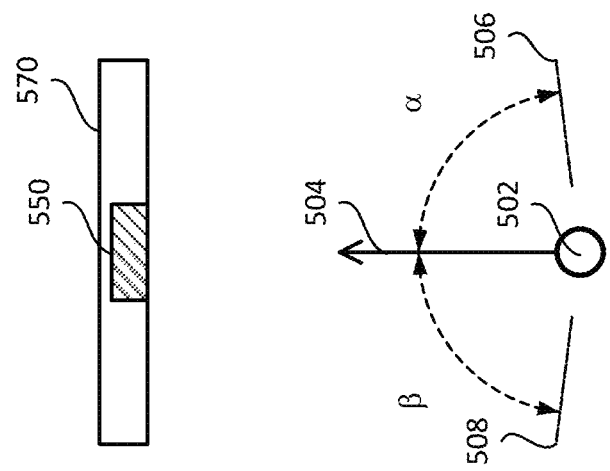
FIG. 6 schematically depicts global angle of a customer relative to the camera and the display shown in FIG. 5.
Figure 5:
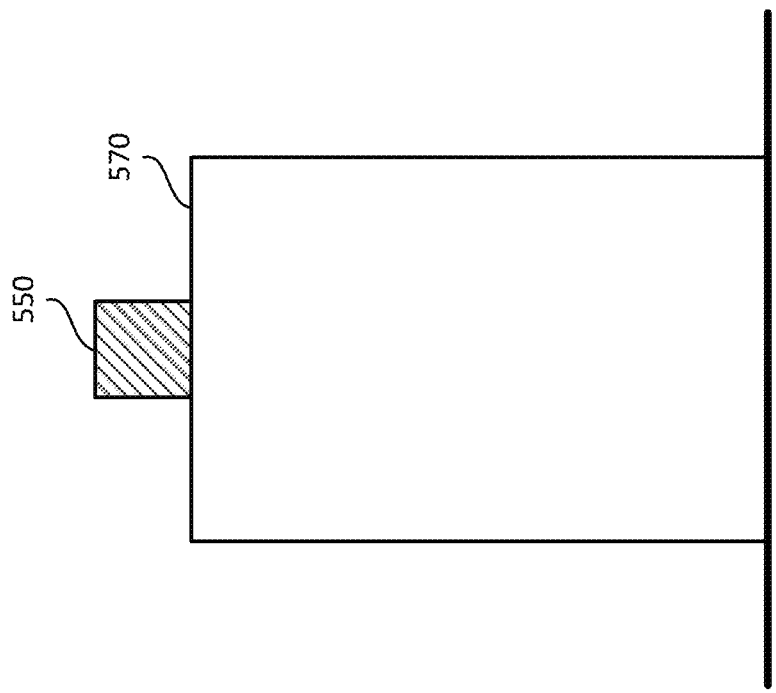
FIG. 5 schematically depicts an arrangement of a camera and a display according to certain embodiments of the present disclosure.

During the process of the predominant first route, the SMPL switching module 232 is configured to, upon receiving the SMPL pose from the 3D pose to SMPL pose converter 228, determine a global rotation angle of the customer relative to the front direction, and if the global rotation angle equals to or is smaller than a predetermined angle, send the SMPL pose from the 3D pose to SMPL pose converter 228 to the SMPL model constructor 234. If the global angle is greater than the predetermined angle, the SMPL switching module 232 is configured to send the SMPL pose based on the 3D pose from the 2D-3D pose converter 224 or the SMPL pose from the image to SMPL pose converter 230 to the SMPL model constructor 234. FIG. 5 and FIG. 6 schematically depict the global angle according to certain embodiments of the present disclosure. As shown in FIG. 5, a camera 550 is placed on top of a display 570, and the camera 550 and the display 570 are connected to a computing device. The camera 550 and the display 570 correspond to the camera 250 and the display 270 shown in FIG. 2. As shown in FIG. 6, when a customer 502 stands in a predefined area directly in front of the display 570, his front facing direction 504 perpendicular to the display 570 is defined as the starting position, where the customer's global rotation angle is 0. When the customer rotate towards his right, his rotation angle $\alpha$ is a positive value from 0 to 180. When $\alpha$ equals to 90 degrees, he is rotated completely right sideway, and when $\alpha$ equals to 180 degrees, he is rotated completely backward. When the customer rotate towards his left, his rotation angle $\beta$ is a negative value from 0 to −180. When $\beta$ equals to −90 degrees, he is rotated completely left sideway, and when $\beta$ equals to −180 degrees, he is rotated completely backward. In certain embodiments, the predetermined global angle or the global angle threshold is in a range of −70 degrees to 70 degrees, or −80 degrees to 80 degrees, or −85 degrees to 85 degrees, or −90 degrees to 90 degrees. When the customer turns around too much towards the side or back, his wrist and/or other joints are often out of the view of the image. Because the camera cannot detect some of the joints, the SMPL pose prediction by the 3D pose to SMPL pose converter 228 (derived from the 3D pose estimator 226) may be inaccurate. By switching the SMPL pose prediction to the image to SMPL pose converter 230 or to the 3D pose to SMPL pose converter 228 (derived from the 2D-3D pose converter 224) under this situation, accuracy of the overall SMPL pose prediction is secured.

In certain embodiments, there is no need to run the image to SMPL pose converter 230 (or the 2D pose estimator 222 and the 2D-3D pose converter 224) in parallel with the 3D pose estimator 226. Instead, when the SMPL switching module 232 determines that the global rotation angle of the SMPL pose from the 3D pose to SMPL pose converter 228 (derived from the 3D pose estimator 226) is greater than the predetermined angle, the SMPL switching module 232 is configured to trigger the image to SMPL pose converter 230 (or the 2D pose estimator 222 and the 2D-3D pose converter 224) to obtain the corresponding SMPL pose from the 2D image components of the 3D image, and send the obtained SMPL pose to the SMPL model constructor 234. In other words, the image to SMPL pose converter 230 (or the 2D pose estimator 222 and the 2D-3D pose converter 224) is inactive most of the time, and it is only used under rare conditions to compensate the function of the 3D pose to SMPL pose converter 228. Alternatively, the second route or the alternative route can also be performed in parallel with the first route.

The SMPL model constructor 234 is configured to, upon receiving the SMPL pose from the SMPL switching module 232 and the SMPL shape parameters from the image to SMPL converter 230 (or from the 2D pose estimator 222—the 2D-3D pose converter 224—the 3D pose to SMPL pose converter 228, or received from the input by the customer), construct a human body model (SMPL model) using the SMPL pose and the SMPL shape parameters, and send the human body model to the try-on module 236. In certain embodiments, there are standard SMPL models corresponding to man and woman, and optionally kids, and one of the standard SMPL models is predetermined by receiving an input from the customer for example indicating whether the customer is a man or a woman, or is predetermined by object detection from the images. The SMPL model constructor 234 then adjust the predetermined standard SMPL model using the SMPL shape parameters measured from the image, or using the SMPL shape parameters received from the customer via the user interface 238, to obtain adjusted SMPL model. The adjusted SMPL model correspond to the customer, and when 3D poses are measured from captured images, the adjusted SMPL model can be moved to the measured 3D poses. The measured shape parameters from the image or the received shape parameters from the customer may include, for example, height, weight, arm-length, and chest/waist circumferences of the customer. In certain embodiments, the SMPL model constructure 234 may also include a set of SMPL shape parameters as default. In certain embodiments, the SMPL model constructor 234 may further render the human body model using textures. In certain embodiments, the rendering is performed by UV mapping, which protects a 2D image to a 3D model surface. In certain embodiments, the SMPL human body model include 6,980 3D surface points to represent the human body.

The try-on module 236 is configured to, upon receiving the human body model from the SMPL model constructor 234 and an input garment, retrieve the virtual model of the garment from the product database 290, dress the human body model with the garment model, and display the dressed human body model on the display 270. The application may further include a rendering function to add texture to the garment, and add face feature of the customer or face feature of a model to the human body model. When the customer moves, his movement is reflected in the display 270 at real-time. In certain embodiments, the try-on module 236 may also predefine a set of movements, and when the human body model and the virtual garment model are available, the try-on module 236 shows the set of movements of the dressed human body model on the display 270. The 3D garment try-on module 218 may further includes an order module. If the customer is satisfied with the dressed garment shown in the display 270, he can purchase the garment using the order module.

The user interface 238 is configured to provide a user interface or graphic user interface for the computing device 210. In certain embodiments, the user or the administrator of the system is able to configure parameters for the computing device 210, especially the parameters used in 3D garment try-on application 218 using the interface 238. In certain embodiments, the display 270 is a touch screen, and the user interface is provided on the touchscreen. The user can choose the garment to be tried on, and input his body feature via the interface on the touchscreen. With the customer's input and the capturing of images of the customer, the 3D garment try-on application 218 is able to provide the customer with the appearance of dressing the chosen garment on the human body model corresponding to the shape of the customer. In certain embodiments, the customer may choose a suit including several compatible garments, and the compatible garments can be dressed on the human body model. In certain embodiments, when the customer chooses one or a few garments, the 3D garment try-on application 218 may add one or a few garments that are compatible with the chosen garments, such that an outfits with recommended garments are dressed on the human body model.

In certain embodiments, the computing device is a server computer, and the camera 250 and the display 270 are connected to a remote computing device belongs to the customer. By this type of arrangement, the customer can perform the garment try-on at home from the remote computing device.

In certain embodiments, the 3D garment try-on application 218 can also be revised and used in other applications. For example, revised application may provide a switch mechanism to construct an SMPL model from either the 3D pose to SMPL pose converter route or the image to SMPL pose converter route, and the constructed SMPL model can be incorporated into a video game, such that the customer's movements can be reflected in the game at real-time.

Figure 7:
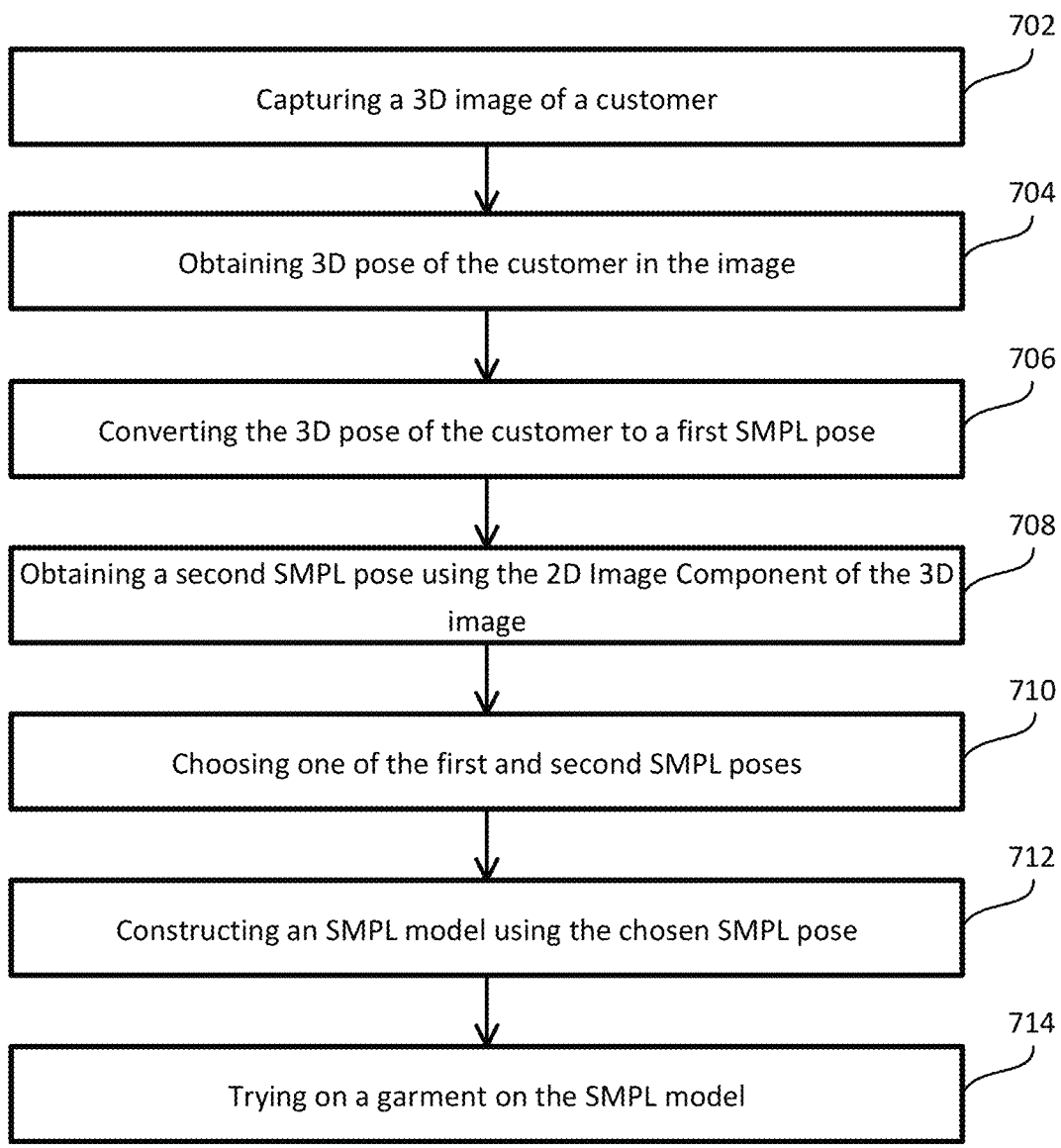
FIG. 7 schematically depicts a method for trying on a garment according to certain embodiments of the present disclosure.

FIG. 7 schematically depicts a method for trying on a garment according to certain embodiments of the present disclosure. In certain embodiments, the method 700 as shown in FIG. 7 may be implemented on a computing device 210 as shown in FIG. 2. It should be particularly noted that, unless otherwise stated in the present disclosure, the steps of the method may be arranged in a different sequential order, and are thus not limited to the sequential order as shown in FIG. 7. The method 700 may be initiated by the computing device 210 when a customer stands on a defined area in front of the camera 250 and the display 270. In this embodiments, a 3D camera such as an ORBBEC 3D camera is used as an example, and all the related machine learning models are well trained in advance.

At procedure 702, the image capturing module 220 instructs the 3D camera 250 to capture a 3D image of the customer, sends the 3D image to the 3D pose estimator 226, and sends the 2D component of the 3D image to the 2D image to SMPL pose converter 230. The captured image may be an RGB image with depth information.

At procedure 704, upon receiving the 3D image from the image capturing module 220, the 3D pose estimator 226 extracts 3D pose from the captured image, and sends the 3D pose to the 3D pose to SMPL pose converter 228. The 3D pose may be represented by 12 keypoint coordinates (x, y, z). In certain embodiments, the 3D pose estimator 226 is a machine learning model. In certain embodiments, the machine learning is performed as described in "efficient human pose estimation from single depth images" by Shotton et al. in IEEE Transactions on Pattern Analysis and Machine Intelligence, 2013, v35(12), 2821-2840, which is incorporated herein by reference in its entirety.

At procedure 706, upon receiving the 3D pose from the 3D pose estimator 226, the 3D pose to SMPL pose converter 228 processes the 3D pose to obtain a first SMPL pose, and sends the first SMPL pose to the SMPL switching module 232. In certain embodiments, the first SMPL pose includes 24 matrixes. 23 of the matrixes correspond to the rotations between 23 keypoints, and one of the 24 matrixes is a global matrix indicating the overall rotation of the human body of the customer. In certain embodiments, the 3D pose to SMPL pose converter 228 has a model structure shown in FIG. 4.

At procedure 708, upon receiving the 2D component of the 3D image from the image capturing module 220, the 2D image to SMPL pose converter 230 learns a second SMPL pose, and sends the second SMPL pose to the SMPL switching module 232. The second SMPL pose has the same format as that of the first SMPL pose. In certain embodiments, the 2D image to SMPL pose converter 230 is an end-to-end pose and shape estimation model. In certain embodiments, the 2D image to SMPL pose converter 230 is graph CMR. In certain embodiments, the 2D image to SMPL pose converter 230 further extracts SMPL shape parameters of the customer from, for example the first captured image, and sends the SMPL shape parameters to the SMPL model constructor 234.

At procedure 710, upon receiving the first SMPL pose from the 3D pose to SMPL pose converter 228, the SMPL switching module 232 calculates a facing angle of the customer using the global matrix. When the facing angle is within a threshold angle range, the switching module 232 sends the first SMPL pose to the SMPL model constructor 234, and when the facing angle is greater than the threshold angle, the switching module 232 sends the second SMPL pose to the SMPL module constructor 234. In certain embodiments, the threshold can be, for example from −80 degrees to 80 degrees.

At procedure 712, the SMPL model constructor 234, upon receiving the SMPL shape parameters and one of the first and second SMPL poses, uses the SMPL shape parameters and the SMPL pose to construct an SMPL human body model, and sends the SMPL human body model to the try-on module 236.

At procedure 714, upon receiving the SMPL human body model, the try-on module 236 retrieves a virtual garment model, dresses the garment model onto the SMPL human body model, and displays the dressed SMPL human body model on the display 270. In certain embodiments, the customer may have entered the garment to be tried on via the user interface 238, such that the try-on module 236 can retrieve the virtual model for the entered garment accordingly. The virtual garment model may be retrieved from the product database 290.

In certain embodiments, the procedure 708 may not be performed as default. Instead, when the SMPL switching module 232 determines that the facing angle calculated form the first SMPL pose is greater than the threshold, it triggers the performance of the procedure 708 to obtains the second SMPL pose.

In certain embodiments, instead of obtaining the second SMPL pose using the 2D image to SMPL converter 230, the method 700 may alternatively use the 2D pose estimator 222, the 2D-3D pose converter 224 and the 3D pose to SMPL pose converter 228 to obtain the second SMPL pose using the 2D image component.

Figure 8:
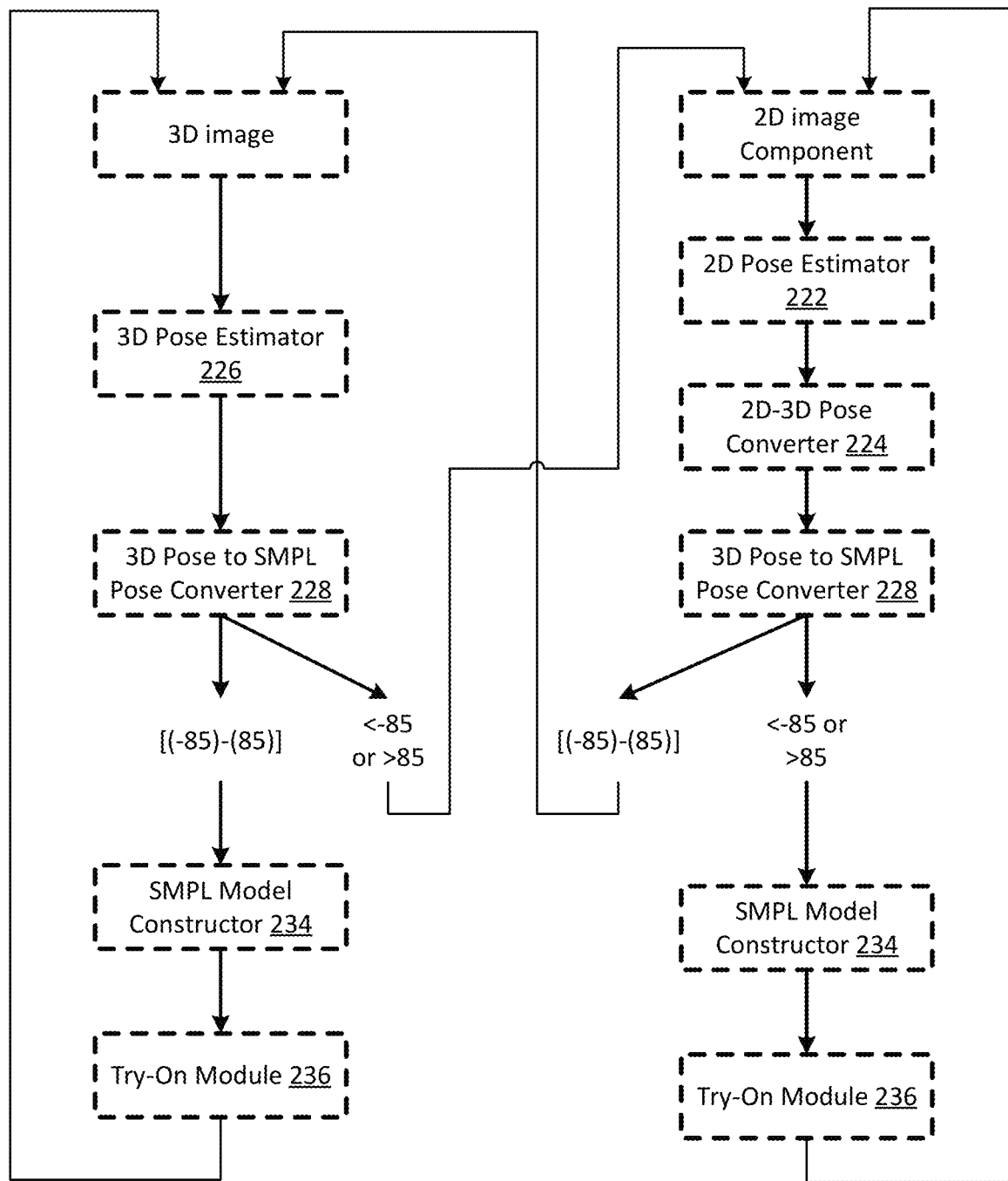
FIG. 8 schematically depicts a switching mechanism between the first route and the second route according to certain embodiments of the present disclosure.

FIG. 8 schematically depicts a switching mechanism between the first route and the second route according to certain embodiments of the present disclosure, where the predetermined range is exemplified as, but is not limited to, from −85 degrees to 85 degrees. As shown in FIG. 8, the switching mechanism starts from the default first route beginning from the 3D image of a customer. The 3D pose estimator 226 processes the 3D image to obtain a 3D pose, and the 3D pose to SMPL pose converter 228 processes the 3D pose to obtain SMPL parameters. The SMPL parameters include a global rotation of the customer. When the global rotation is within the predetermined range, the process continues, and the SMPL model constructor 234 constructs an SMPL model using the SMPL parameters, and the try-on module 235 displays the SMPL model together with a rendered garment. The process is performed iteratively. When the global rotation of the customer is out of the predetermined range, the process switches to the second route. The 2D pose estimator estimates a 2D pose of the customer using the 2D mage component, the 2D-3D pose converter 224 converts the 2D pose to a 3D pose, and the 3D pose to SMPL pose converter 228 generates SMPL parameters from the 3D pose. The SMPL parameters include a global rotation of the customer. When the global rotation is out of the predetermined range, the process continues, and the SMPL model constructor 234 constructs the SMPL model using the SMPL parameters, and the try-on module 235 displays the SMPL model together with the rendered garment. The process is performed iteratively. When the global rotation of the customer is within the predetermined range, the process switches back to the first route. In certain embodiments, at the immediate round after switching, the second route or the first route may skip the comparison of the global rotation with the predetermined range.

Figure 9:
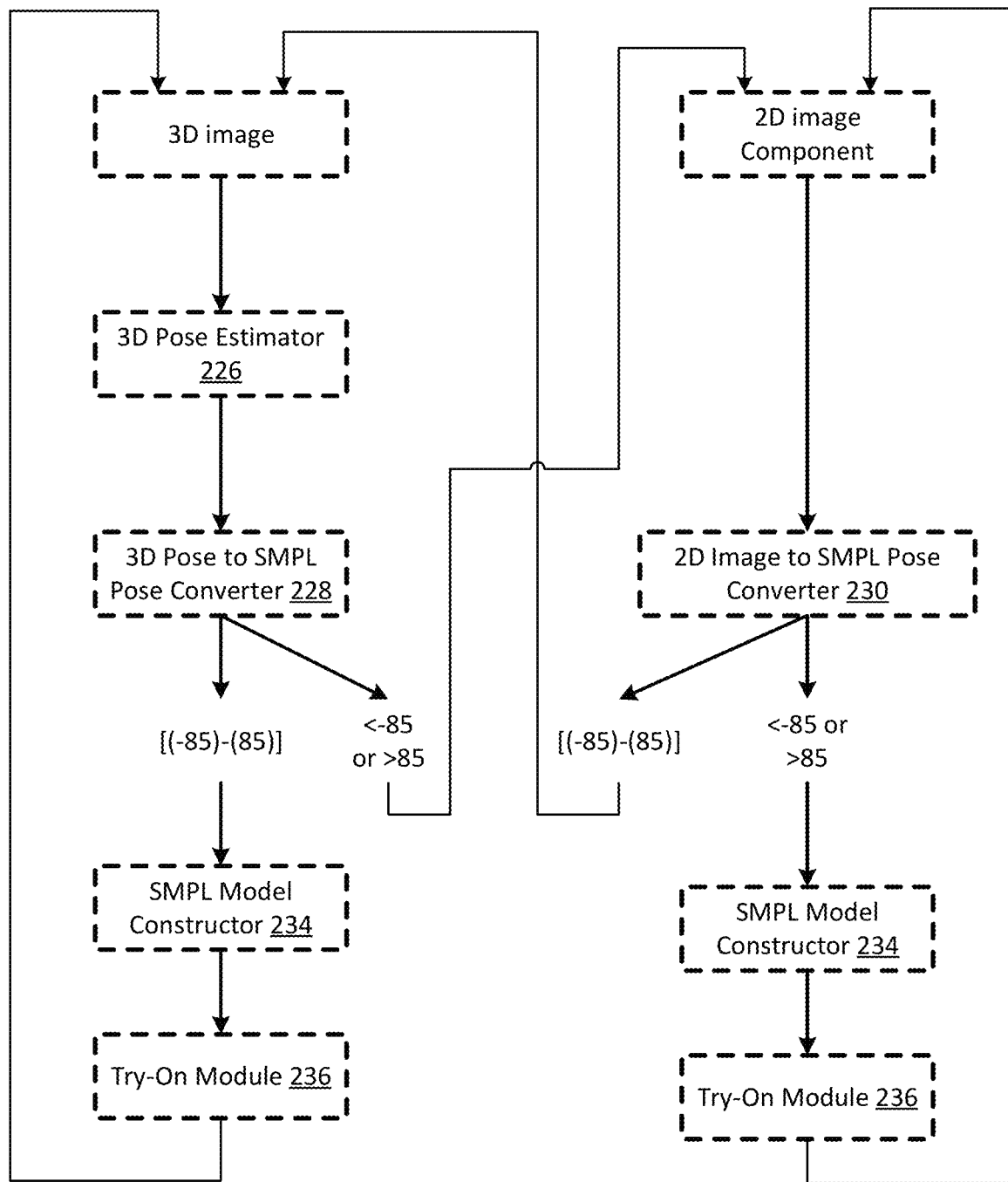
FIG. 9 schematically depicts a switching mechanism between the first route and the alternative route according to certain embodiments of the present disclosure.

FIG. 9 schematically depicts a switching mechanism between the first route and the alternative route according to certain embodiments of the present disclosure, where the predetermined range is exemplified as from −85 degrees to 85 degrees. As shown in FIG. 9, the switching mechanism starts from the default first route beginning from the 3D image of a customer. The 3D pose estimator 226 processes the 3D image to obtain a 3D pose, and the 3D pose to SMPL pose converter 228 processes the 3D pose to obtain SMPL parameters. The SMPL parameters include a global rotation of the customer. When the global rotation is within the predetermined range, the process continues, and the SMPL model constructor 234 constructs an SMPL model using the SMPL parameters, and the try-on module 235 displays the SMPL model together with a rendered garment. The process is performed iteratively. When the global rotation of the customer is out of the predetermined range, the process switches to the alternative route. The 2D image to SMPL pose converter 230 generates SMPL parameters using the 2D image component. The SMPL parameters include a global rotation of the customer. When the global rotation is out of the predetermined range, the process continues, and the SMPL model constructor 234 constructs the SMPL model using the SMPL parameters, and the try-on module 235 displays the SMPL model together with the rendered garment. The process is performed iteratively. When the global rotation of the customer is within the predetermined range, the process switches back to the first route. In certain embodiments, at the immediate round after switching, the alternative route or the first route may skip the comparison of the global rotation with the predetermined range.

In a further aspect, the present disclosure is related to a non-transitory computer readable medium storing computer executable code. The code, when executed at a processor 212 of the computing device 210, may perform the methods as described above. In certain embodiments, the non-transitory computer readable medium may include, but not limited to, any physical or virtual storage media. In certain embodiments, the non-transitory computer readable medium may be implemented as the storage device 216 of the computing device 210 as shown in FIG. 2.

In certain embodiments, an alternative solution could be using a multi-way matching algorithm to cluster the detected 2D poses in all views. Each resulting cluster encodes 2D poses of the same person across different views and consistent correspondences across the keypoints, from which the 3D poses of each person can be inferred. But the efficiency of the solution may not be as good, and it may also increase the cost.

In summary, certain embodiments of the present disclosure, among other things, have the following advantages. (1) A 3D pose is generated from a 3D image. The SMPL pose of a human body model is then generated from 3D pose. Because the 3D pose is defined by accurate three dimensional keypoint coordinates, the generated SMPL pose is accurate, and the consecutive SMPL models generated by this way are smooth. (2) The end-to-end human pose and shape estimation model is provided as a regulator of the 3D pose to SMPL pose conversion, where 2D component of the 3D image is used directly to generate the SMPL pose without the 3D information. This is critical when the customer turns around too much from the front direction. By providing a switching mechanism between the 3D pose to SMPL pose route and the end-to-end human pose and shape estimation route, the disclosure guarantees the results to be logical under any situations. (3) As an alternative to the end-to-end human pose and shape estimation, the disclosure can also extract the 2D pose from the 2D component of the 3D image, project the 2D pose to the 3D pose using the temporal dilated convolutional model, and predict the SMPL pose from the projected 3D pose. As described above, (1) is the preferred route in the try-on application, and either (2) or (3) can be used when the customer turns toward his side too much or turns backward. Under certain conditions, (2) is preferred than (3) because it considers temporal information.

By the above design, the present disclosure can obtain SMPL human body model with a real-time speed. It helps the try-on system to create a realistic try-on scene. It can also be used for some other entertainment applications, such as control the pre-built 3D animations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method, comprising:
capturing, by a camera, a three dimensional (3D) image of a customer;
obtaining, by a computing device, a first 3D pose of the customer in the 3D image;
generating, by the computing device performing a machine learning model on the first 3D pose, a first skinned multi-person linear model (SMPL) pose, wherein the first SMPL pose comprises a plurality of rotation matrixes representing rotations of the customer's joints and a global rotation matrix representing whole body rotation of the customer;
calculating, by the computing device, an angle of the whole body rotation of the customer based on the global rotation matrix;
when the angle of the whole body rotation is in a predefined range relative to a front direction of the customer: constructing an SMPL model using the first SMPL pose; and
when the angle of the whole body rotation is out of the predefined range: generating a second SMPL pose using two dimensional (2D) component of the 3D image, and constructing the SMPL model using the second SMPL pose.

2. The method of claim 1, further comprising: dressing a garment model onto the SMPL model, and displaying the SMPL model dressed in the garment model on a display connected to the computing device.

3. The method of claim 2, further comprising: purchasing a garment in the garment model according to an instruction from the customer.

4. The method of claim 2, further comprising: rendering the SMPL model using the image of the customer.

5. The method of claim 2, further comprising: obtaining an SMPL shape from the image of the customer before the step of constructing the SMPL model, and constructing the SMPL model using the SMPL shape and one of the first and second SMPL poses.

6. The method of claim 1, wherein the machine learning model comprises:
a non-residual block comprising a first fully-connected layer, a first batchnorm layer, and a first rectified linear unit (ReLU) layer;
a first residual block connected to the non-residual block, comprising a second fully-connected layer, a second batchnorm layer, and a second ReLU layer;
a second residual block connected to the first residual block, comprising a third fully-connected layer, a third batchnorm layer, and a third ReLU layer;
a plurality of joint self-attention blocks connected to the second residual block, each of the plurality of the joint self-attention blocks predicting a feature corresponding to one of a plurality of joints of the customer; and
a global self-attention block connected to the second residual block, predicting an overall feature corresponding to all of the plurality of joints of the customer.

7. The method of claim 1, wherein the predefined range is −80 to 80 degrees relative to the front direction of the customer.

8. The method of claim 1, wherein the camera is a 3D ORBBEC camera, and the step of obtaining the first 3D pose of the customer is performed by an ORBBEC 3D pose model.

9. The method of claim 1, wherein the step of generating the second SMPL pose of the user comprises:
estimating a 2D pose of the customer from the 2D component of the 3D image;
converting the 2D pose to a second 3D pose using a temporal dilated convolutional model; and
generating the second SMPL pose from the second 3D pose using the machine learning model.

10. The method of claim 9, wherein the first 3D pose or the second 3D pose includes 3D coordinates of 12 joints of the customer, and the 12 joints comprise: left shoulder, right shoulder, left elbow, right elbow, left wrist, right wrist, left hip, right hip, left knee, right knee, left ankle, and right ankle.

11. The method of claim 1, wherein the step of obtaining the second SMPL pose of the user is performed using an end-to-end pose and shape estimation model.

12. The method of claim 11, wherein the end-to-end pose and shape estimation model is graph convolutional mesh regression (CMR).

13. A system comprising a computing device and a camera connected to the computing device, wherein the computing device comprises a processor and a storage device storing computer executable code, and the computer executable code, when executed at the processor, is configured to:
instruct the camera to capture a three dimensional (3D) image of a customer;
obtain a first 3D pose of the customer in the 3D image;
generate, by performing a machine learning model on the first 3D pose, a first skinned multi-person linear model (SMPL) pose, wherein the first SMPL pose comprises a plurality of rotation matrixes representing rotations of the customer's joints and a global rotation matrix representing whole body rotation of the customer;
calculate an angle of the whole body rotation of the customer based on the global rotation matrix;
when the angle of the whole body rotation is in a predefined range relative to a front direction of the customer: construct an SMPL model using the first SMPL pose; and
when the angle of the whole body rotation is out of the predefined range: generate a second SMPL pose using two dimensional (2D) component of the 3D image, and construct the SMPL model using the second SMPL pose.

14. The system of claim 13, wherein the computer executable code is further configured to dress a garment model onto the SMPL model, and display the SMPL model dressed in the garment model on a display connected to the computing device.

15. The system of claim 13, wherein the machine learning model comprises:
a non-residual block comprising a first fully-connected layer, a first batchnorm layer, and a first rectified linear unit (ReLU) layer;
a first residual block connected to the non-residual block, comprising a second fully-connected layer, a second batchnorm layer, and a second ReLU layer;
a second residual block connected to the first residual block, comprising a third fully-connected layer, a third batchnorm layer, and a third ReLU layer;
a plurality of joint self-attention blocks connected to the second residual block, each of the plurality of the joint self-attention blocks predicting a feature corresponding to one of a plurality of joints of the customer; and a global self-attention block connected to the second residual block, predicting an overall feature corresponding to all of the plurality of joints of the customer.

16. The system of claim 13, wherein the predefined range is −80 to 80 degrees relative to the front direction of the customer.

17. The system of claim 13, wherein the computer executable code is configured to generate the second SMPL pose by:
   estimating a 2D pose of the customer from 2D component of the 3D image; and
   converting the 2D pose to a second 3D pose using a temporal dilated convolutional model; and
   generating the second SMPL pose from the second 3D pose using the machine learning model.

18. The system of claim 13, wherein the computer executable code is configured to generate the second SMPL pose using an end-to-end pose and shape estimation model.

19. A non-transitory computer readable medium storing computer executable code, wherein the computer executable code, when executed at a processor of a computing device, is configured to:
   instruct a camera to capture a three dimensional (3D) image of a customer;
   obtain a first 3D pose of the customer in the 3D image;
   generate, by performing a machine learning model on the first 3D pose, a first skinned multi-person linear model (SMPL) pose, wherein the first SMPL pose comprises a plurality of rotation matrixes representing rotations of the customer's joints and a global rotation matrix representing whole body rotation of the customer;
   calculate an angle of the whole body rotation of the customer based on the global rotation matrix;
   when the angle of the whole body rotation is in a predefined range relative to a front direction of the customer: construct an SMPL model using the first SMPL pose; and
   when the angle of the whole body rotation is out of the predefined range: generate a second SMPL pose using two dimensional (2D) component of the 3D image, and construct the SMPL model using the second SMPL pose.

20. The non-transitory computer readable medium of claim 19, wherein the machine learning model comprises:
   a non-residual block comprising a first fully-connected layer, a first batchnorm layer, and a first rectified linear unit (ReLU) layer;
   a first residual block connected to the non-residual block, comprising a second fully-connected layer, a second batchnorm layer, and a second ReLU layer;
   a second residual block connected to the first residual block, comprising a third fully-connected layer, a third batchnorm layer, and a third ReLU layer;
   a plurality of joint self-attention blocks connected to the second residual block, each of the plurality of the joint self-attention blocks predicting a feature corresponding to one of a plurality of joints of the customer; and
   a global self-attention block connected to the second residual block, predicting an overall feature corresponding to all of the plurality of joints of the customer.

* * * * *